(12) United States Patent
Lin

(10) Patent No.: US 8,458,906 B2
(45) Date of Patent: Jun. 11, 2013

(54) METHOD OF MAKING A SUNSHADE DEVICE

(75) Inventor: Paul Lin, Tainan (TW)

(73) Assignee: Macauto Industrial Co., Ltd. (TW)

( * ) Notice: Subject to any disclaimer, the term of this patent is extended or adjusted under 35 U.S.C. 154(b) by 330 days.

(21) Appl. No.: 13/016,681

(22) Filed: Jan. 28, 2011

(65) Prior Publication Data

US 2012/0192397 A1 Aug. 2, 2012

(51) Int. Cl.
*B21D 53/88* (2006.01)

(52) U.S. Cl.
USPC .............................................. 29/897.2

(58) Field of Classification Search
USPC ................ 29/897.2, 428, 467; 160/370.21, 160/370.22
See application file for complete search history.

(56) References Cited

FOREIGN PATENT DOCUMENTS

CN 202088848 * 12/2011

* cited by examiner

*Primary Examiner* — John C Hong
(74) *Attorney, Agent, or Firm* — Brinks Hofer Gilson & Lione

(57) ABSTRACT

A method of making a sunshade device includes the steps of: attaching two tension cords to left and right sides of a sunshade cloth, and allowing the tension cords to extend beyond front and rear ends thereof to form front and rear cord extension sections; fixing the rear cord extension sections to a latch unit and a spring unit, respectively, and inserting the latch and spring units respectively into opposite ends of a tubular winding shaft; clamping the rear end of the sunshade cloth; drawing the front cord extension sections to move the winding shaft close to the rear end of the sunshade cloth; using two cord-pulling tools to pull the respective front cord extension sections; fixing the front cord extension sections to the respective end pieces; and fixing the winding shaft to the sunshade cloth.

8 Claims, 9 Drawing Sheets

METHOD OF MAKING A SUNSHADE DEVICE

BACKGROUND OF THE INVENTION

1. Field of the Invention

The invention relates to a method of making a sunshade device, and more particularly to a method of making a sunshade device that can prevent removal of a sunshade cloth from a slide rail.

2. Description of the Related Art

A conventional sunshade device for a vehicle generally includes parallel left and right slide rails, and a sunshade unit mounted between the slide rails. The sunshade unit includes a sunshade cloth that is windable, and a pull rod connected to a pull end of the sunshade cloth. In use, left and right sides of the sunshade cloth are moved to slide along the respective slide rails to place the sunshade cloth in a wound or stretched position. How to produce a sunshade device that can permit the sunshade cloth to slide smoothly along and that can prevent removal of the sunshade cloth from the slide rails has become an important subject of development of business world.

SUMMARY OF THE INVENTION

Therefore, an object of the present invention is to provide a method of making a sunshade device that has a sunshade cloth which can be prevented from being removed from slide rails by pre-pulling tension cords respectively disposed on two opposite sides of the sunshade cloth.

According to this invention, a method of making a sunshade device comprises the steps of: attaching two tension cords respectively to left and right sides of a sunshade cloth, and allowing the tension cords to extend beyond front and rear ends of the sunshade cloth to form front and rear cord extension sections; attaching a pull rod to the front end of the sunshade cloth, and inserting two end pieces into two opposite ends of the pull rod; fixing the rear cord extension sections to a latch unit and a spring unit, respectively, and inserting the latch unit and the spring unit respectively into two opposite ends of a tubular winding shaft; positioning the pull rod; clamping the rear end of the sunshade cloth; drawing the front cord extension sections to extend forward and outward of the sunshade cloth to move the tubular winding shaft close to the rear end of the sunshade cloth; using two cord-pulling tools to clamp the front cord extension sections, respectively; activating the cord-pulling tools to pull the front cord extension sections, respectively; fixing the front cord extension sections to the respective end pieces; and fixing the tubular winding shaft to the sunshade cloth.

The advantages of the present invention reside in the fact that through the configuration of the step of stretching the sunshade cloth, the tension cords can be pulled using the cord-pulling tools and can have restoring forces, so that the sunshade cloth can be prevented from loosening and from being removed from the slide rails.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
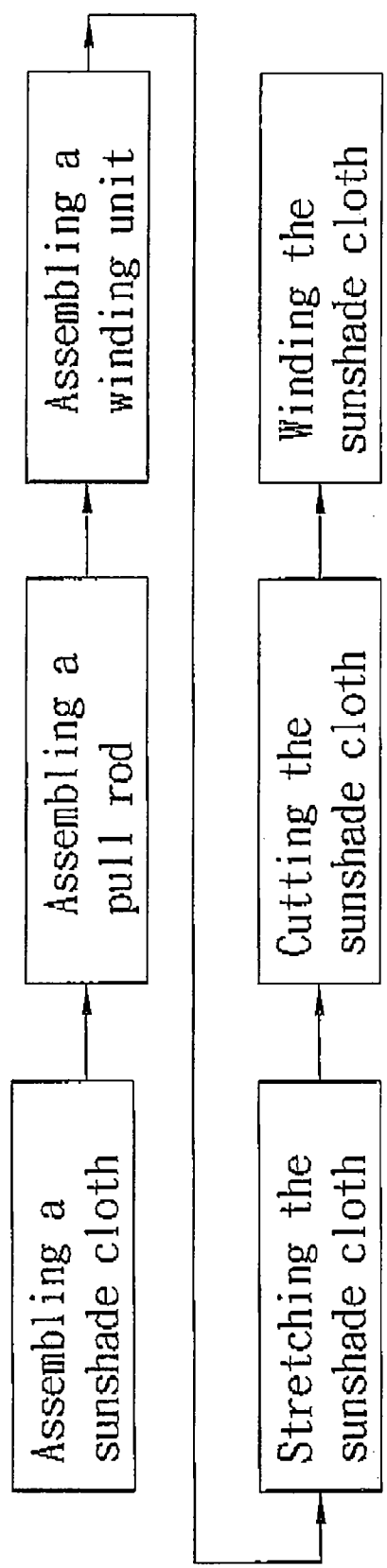
FIG. 1 is a flow chart, illustrating the steps involved in making a sunshade device according to the preferred embodiment of the present invention.
Figure 2:
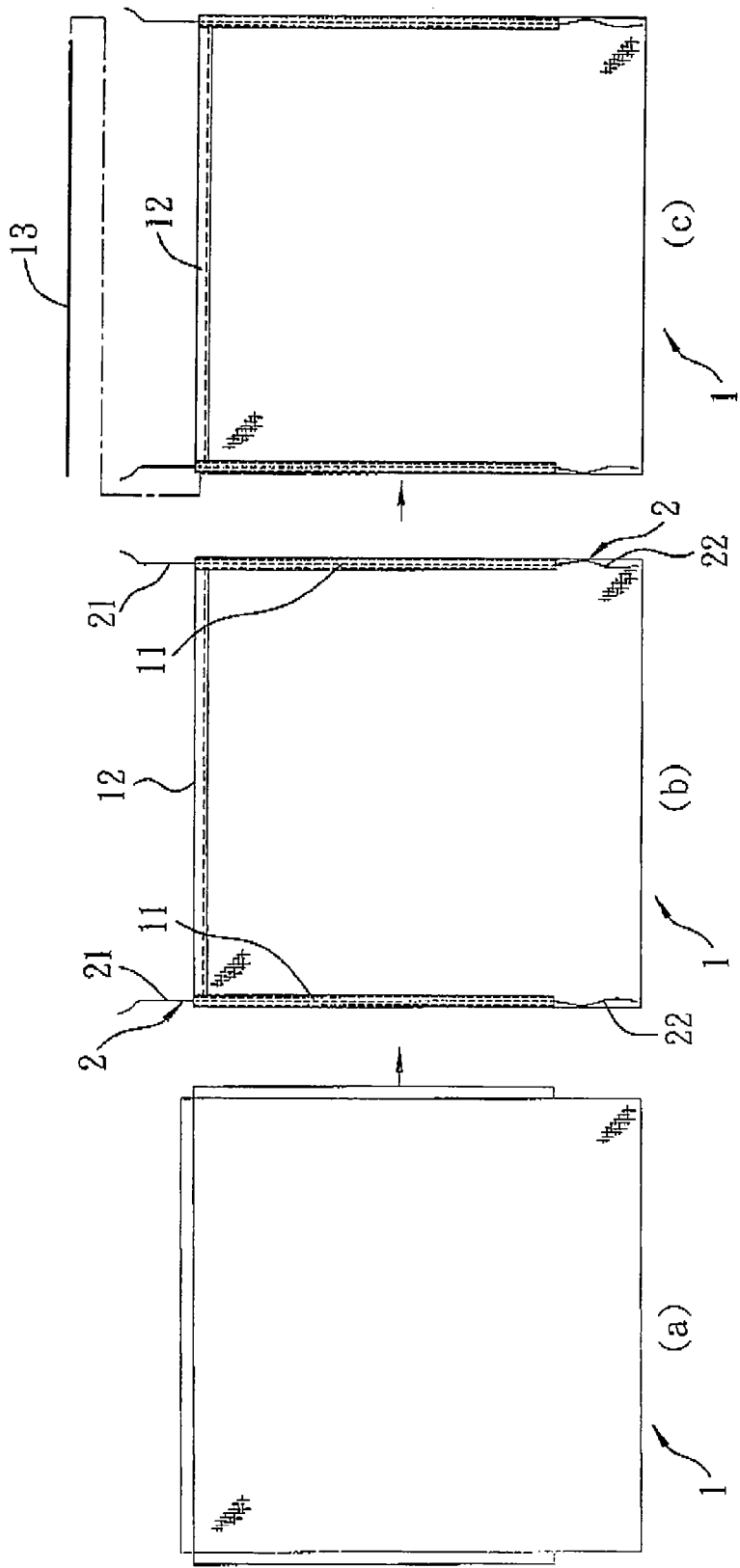
FIGS. 2a~c are schematic views, illustrating the consecutive steps involved in assembling a sunshade cloth of the preferred embodiment.
Figure 3:
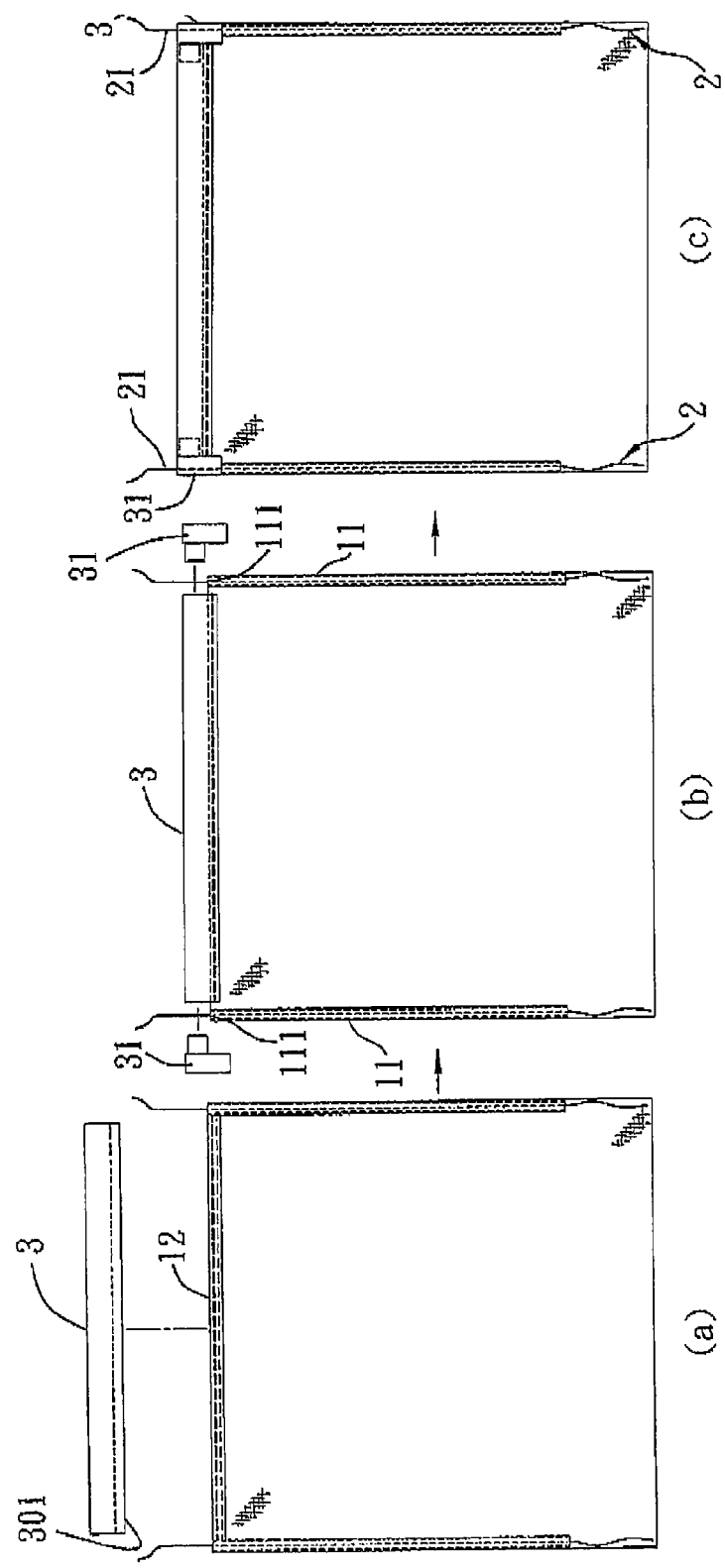
FIGS. 3a~c are schematic views, illustrating the consecutive steps involved in assembling a pull rod of the preferred embodiment.
Figure 4:
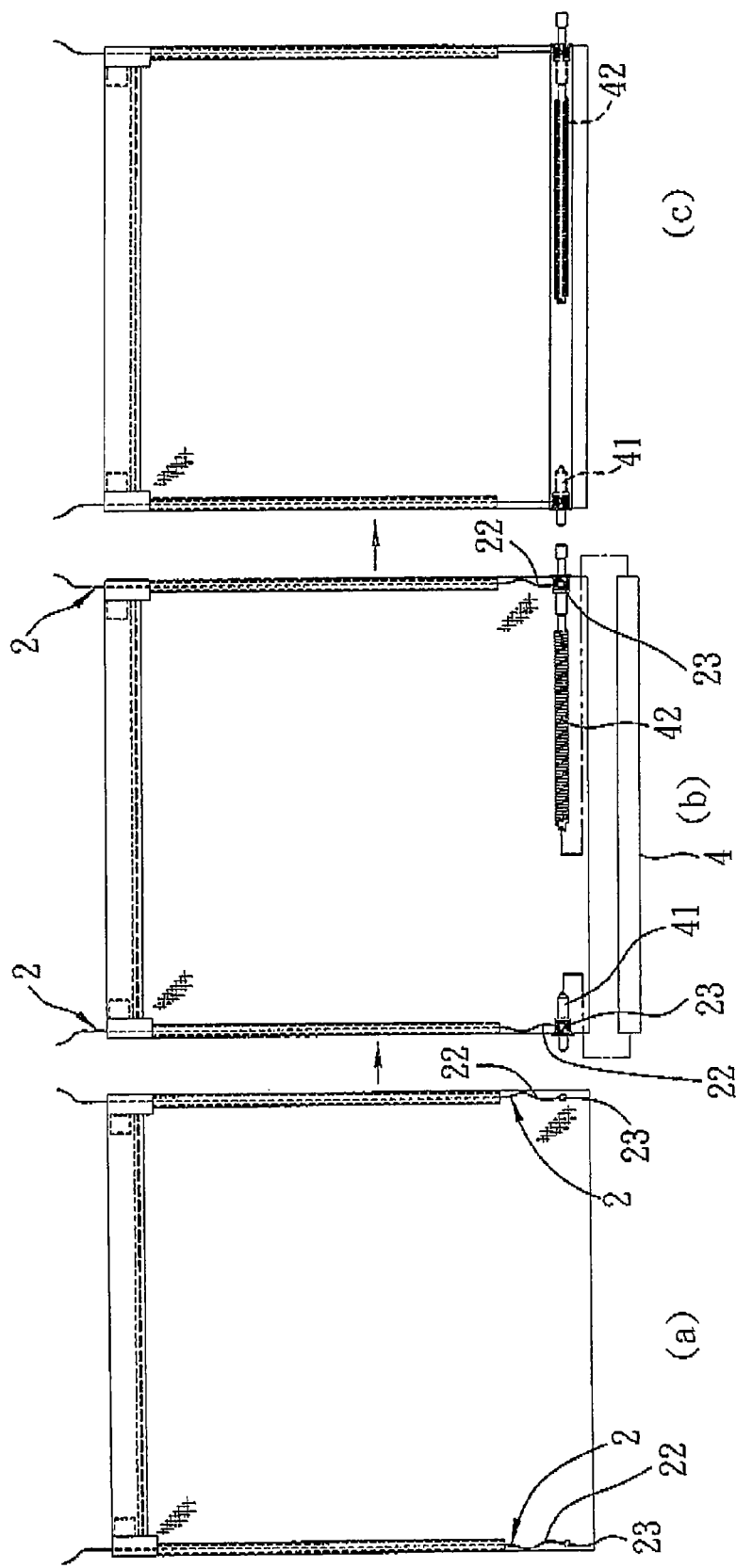
FIGS. 4a~c are schematic views, illustrating the consecutive steps involved in assembling a winding unit of the preferred embodiment.
Figure 5:
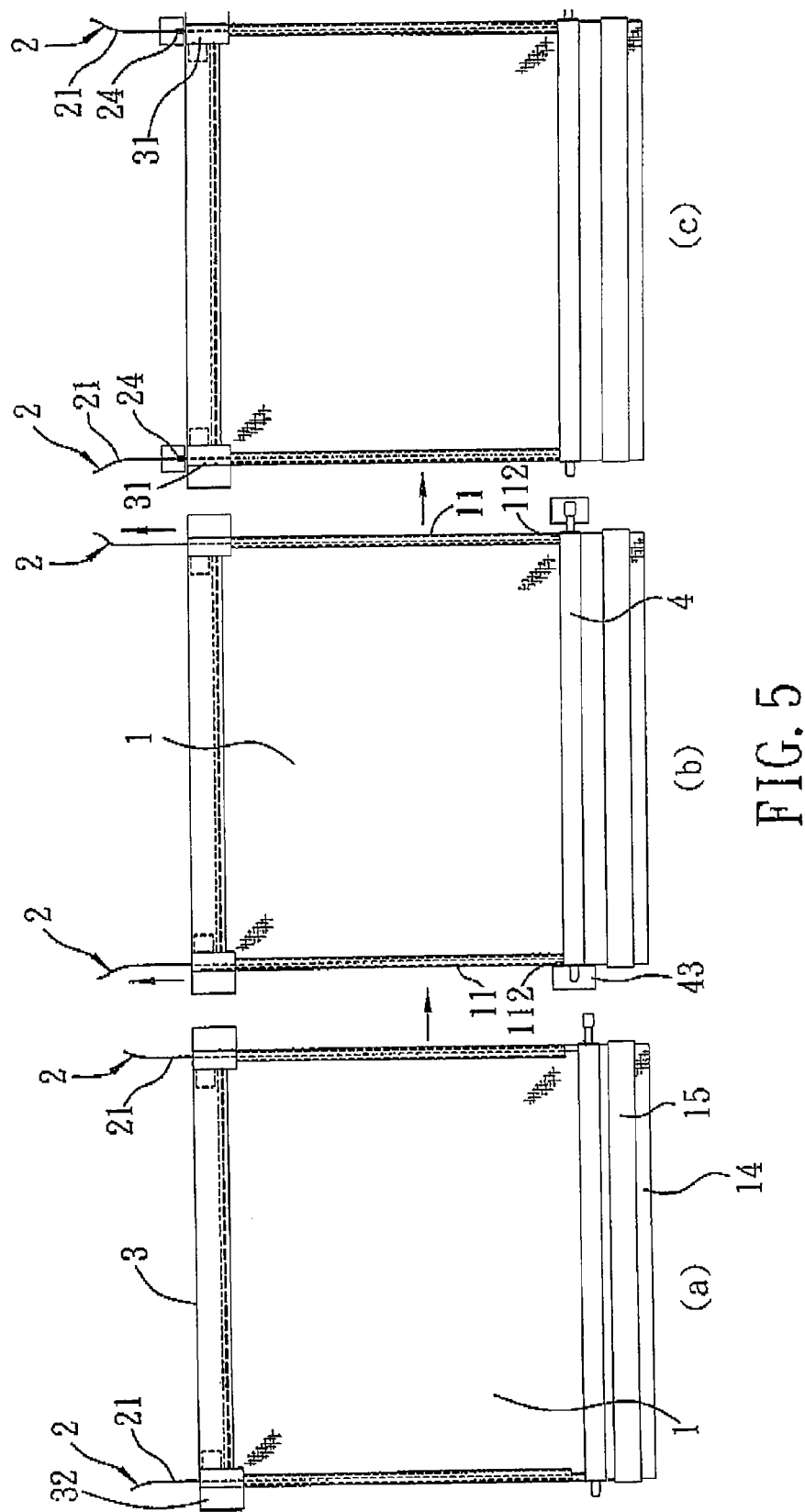
FIGS. 5a~c are schematic views, illustrating the consecutive steps involved in stretching the sunshade cloth of the preferred embodiment.

Referring to FIGS. 1 to 9, a method of making a sunshade device according to the preferred embodiment of the present invention includes the steps of: assembling a sunshade cloth 1, assembling a hollow pull rod 3, assembling a winding unit, stretching the sunshade cloth 1, and cutting and winding of the sunshade cloth 1.

To assemble the sunshade cloth 1, with reference to FIGS. 2a~c, the sunshade cloth 1 is first prepared, after which two tension cords 2 made of a robust material, such as stainless steel (SUS304), are respectively attached to left and right sides of the sunshade cloth 1. Each of the left and right sides of the sunshade cloth 1 is then folded and stitched to form a tubular sleeve 11 for covering a respective tension cord 2. Each tension cord 2 extends beyond front and rear ends of the tubular sleeve 11 to form front and rear cord extension sections 21, 22. A front end of the sunshade cloth 1 is folded and stitched to form a tubular end 12, after which a cross bar 13 is inserted into the tubular end 12.

To assemble the hollow pull rod 3, with reference to FIGS. 3a~c, the pull rod 3 is sleeved on the tubular end 12 of the sunshade cloth 1 via an axially extending wall opening 301 in the pull rod 3 so that the tubular end 12 and the cross bar 13 are disposed within the pull rod 3, after which the pull rod 3 is placed on a pull rod assembly tool (not shown). Two end pieces 31 are inserted into left and right ends of the pull rod 3, respectively, by using the pull rod assembly tool, after which the pull rod 3 is removed from the pull rod assembly tool. A rear portion (not shown) of each end piece 31 that projects out from the pull rod 3 abuts against a front end 111 of the sleeve 11. The front cord extension section 21 of each tension cord 2 is looped around a respective end piece 31, and is pulled out frontward.

To assemble the winding unit, with reference to FIGS. 4a~c, two rear terminal pieces 23 are sleeved respectively on the rear cord extension sections 22 of the tension cords 2. The rear terminal pieces 23 are pressed fixedly onto the tension cords 2 by using a rear terminal piece pressing tool (not shown), and the portion of each tension cord 2 that extends rearward beyond the respective rear terminal piece 23 is trimmed. Afterwards, a tubular winding shaft 4 is prepared, and a bottom side thereof is adhered with a double-sided adhesive tape 44 (see FIGS. 6 and 7) having a releasable sheet (not shown). The winding shaft 4 is then placed on a winding shaft assembly tool (not shown), and a latch unit 41 is placed on a left end of the winding shaft 4. The rear terminal piece 23 at the rear cord extension section 22 of the left tension cord 2 is fixed into an end groove (not shown) of the latch unit 41, and the rear cord extension section 22 of the left tension cord 2 is fixed into a cord groove (not shown) of the latch unit 41. A spring unit 42 is inserted into the winding shaft 4 through a right end thereof, and the rear terminal piece 23 at the rear cord extension section 22 of the right tension cord 2 is fixed into an end groove (not shown) of the spring unit 42. The rear cord extension section 22 of the right tension cord 2 is fixed into a cord groove (not shown) of the spring unit 42. By using the winding shaft assembly tool (not shown), the latch unit 41 is fixed to the left end of the winding shaft 4, and the spring unit 42 is inserted and fixed into the right end of the winding shaft 4. The winding shaft 4 is then removed from the winding shaft assembly tool.

To stretch the sunshade cloth 1, with reference to FIGS. 5a~c, the pull rod 3 is positioned on a pull rod fixing seat 32, and a rear end 14 of the sunshade cloth 1 is clamped on a cloth-pulling tool 15. The front cord extension sections 21 of the tension cords 2 are then drawn to extend forward and outward of the sunshade cloth 1 to move the winding shaft 4 close to the rear ends 112 of the sleeves 11. After the releasable sheet of the double-sided adhesive tape 44 (see FIGS. 6 and 7) is removed, through a connection tool 43 that is hung on top of the sunshade cloth 1, two front terminal pieces 24 are sleeved respectively on the front cord extension sections 21 of the tension cords 2, and are pushed forward until positioned in proximity to the end pieces 31.

Figure 6:
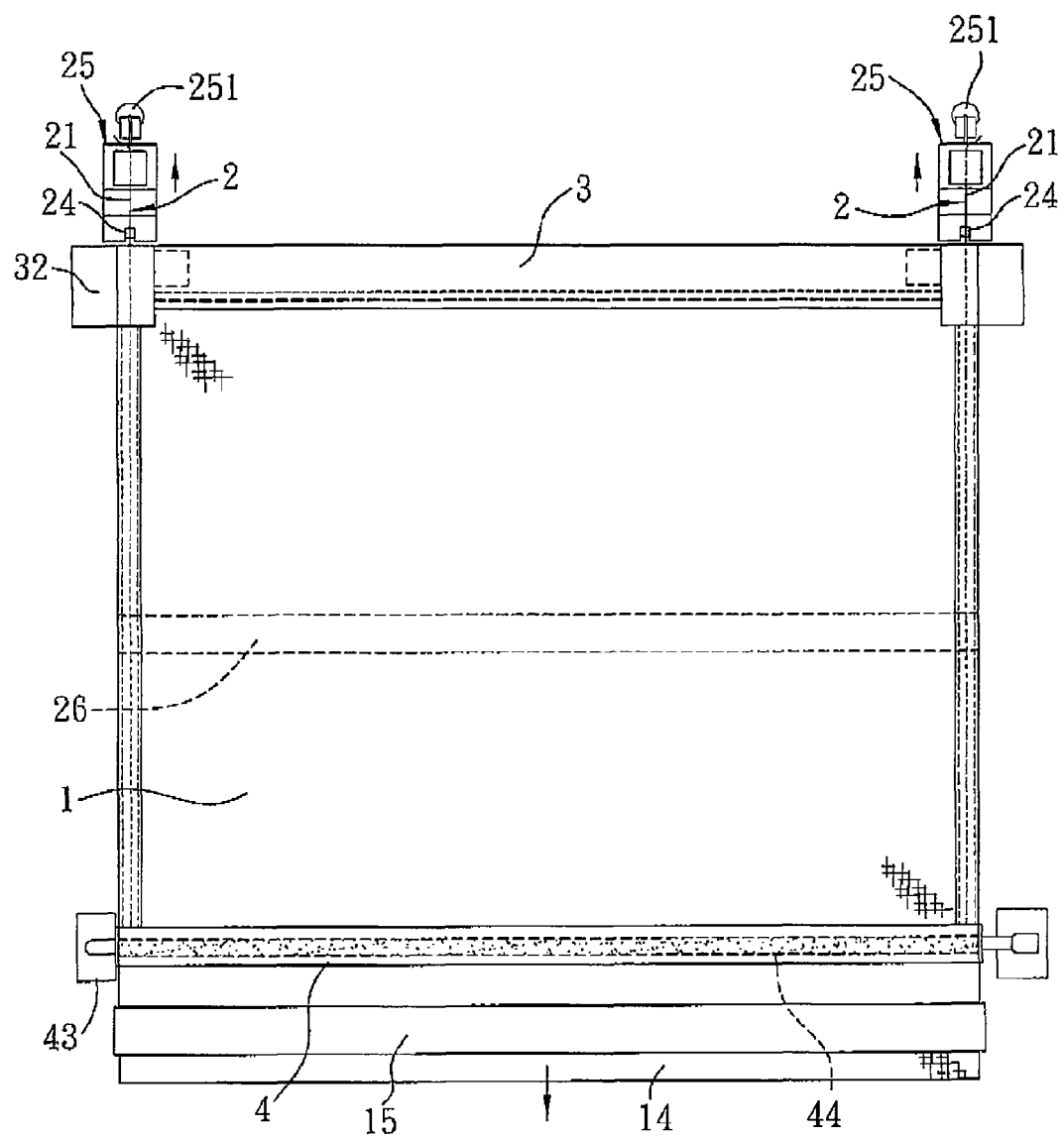
FIG. 6 is a schematic view, illustrating front cord extension sections of two tension cords being clamped respectively on two cord-pulling tools.
Figure 7:
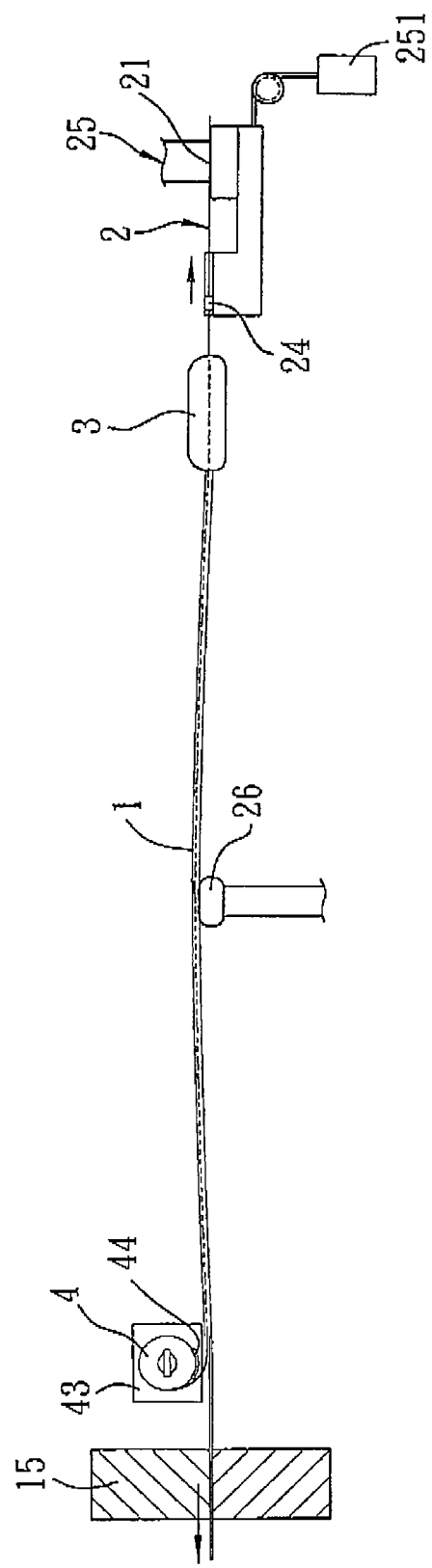
FIG. 7 is a partly sectional view of the preferred embodiment, illustrating how the sunshade cloth and the tension cords are stretched.
Figure 8:
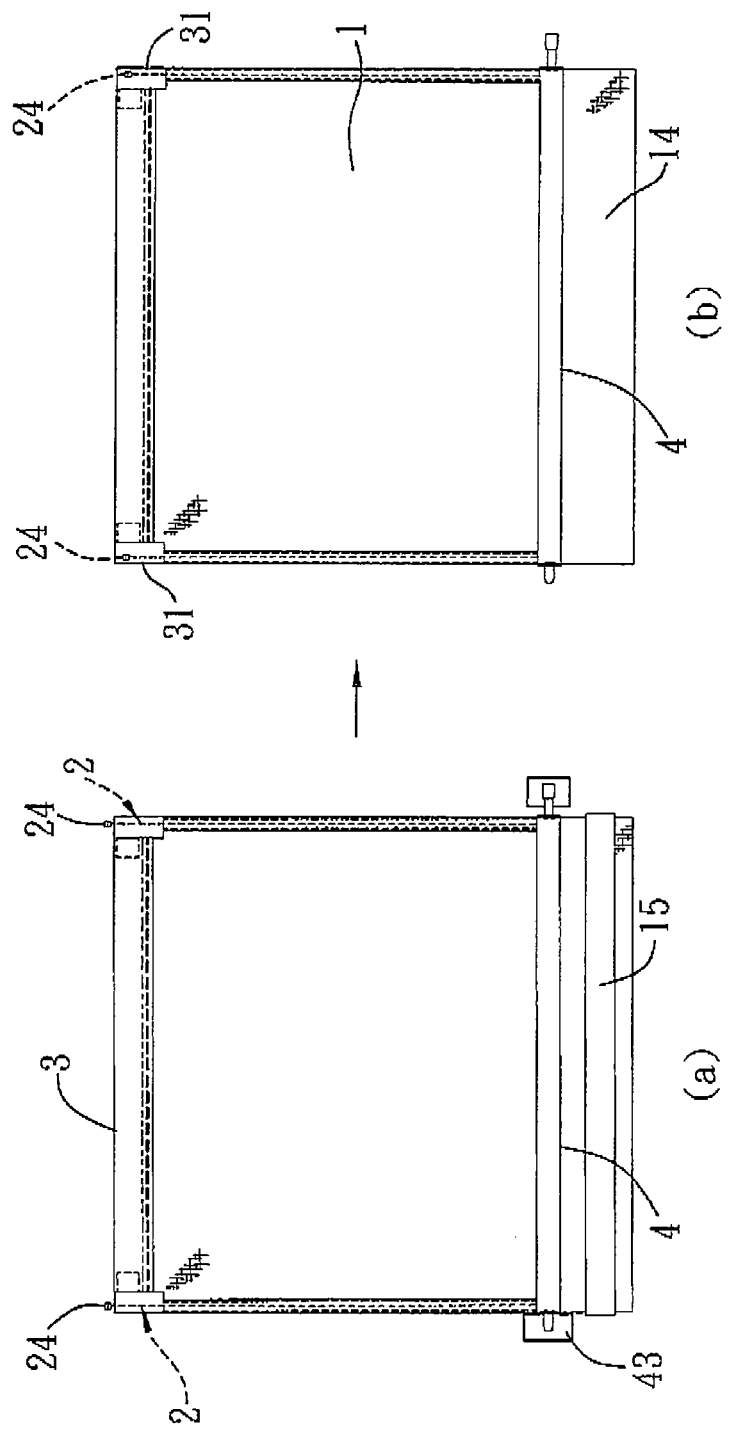
FIGS. 8a~b are schematic views, illustrating the consecutive steps involved in positioning front terminal pieces on respective end pieces.
Figure 9:
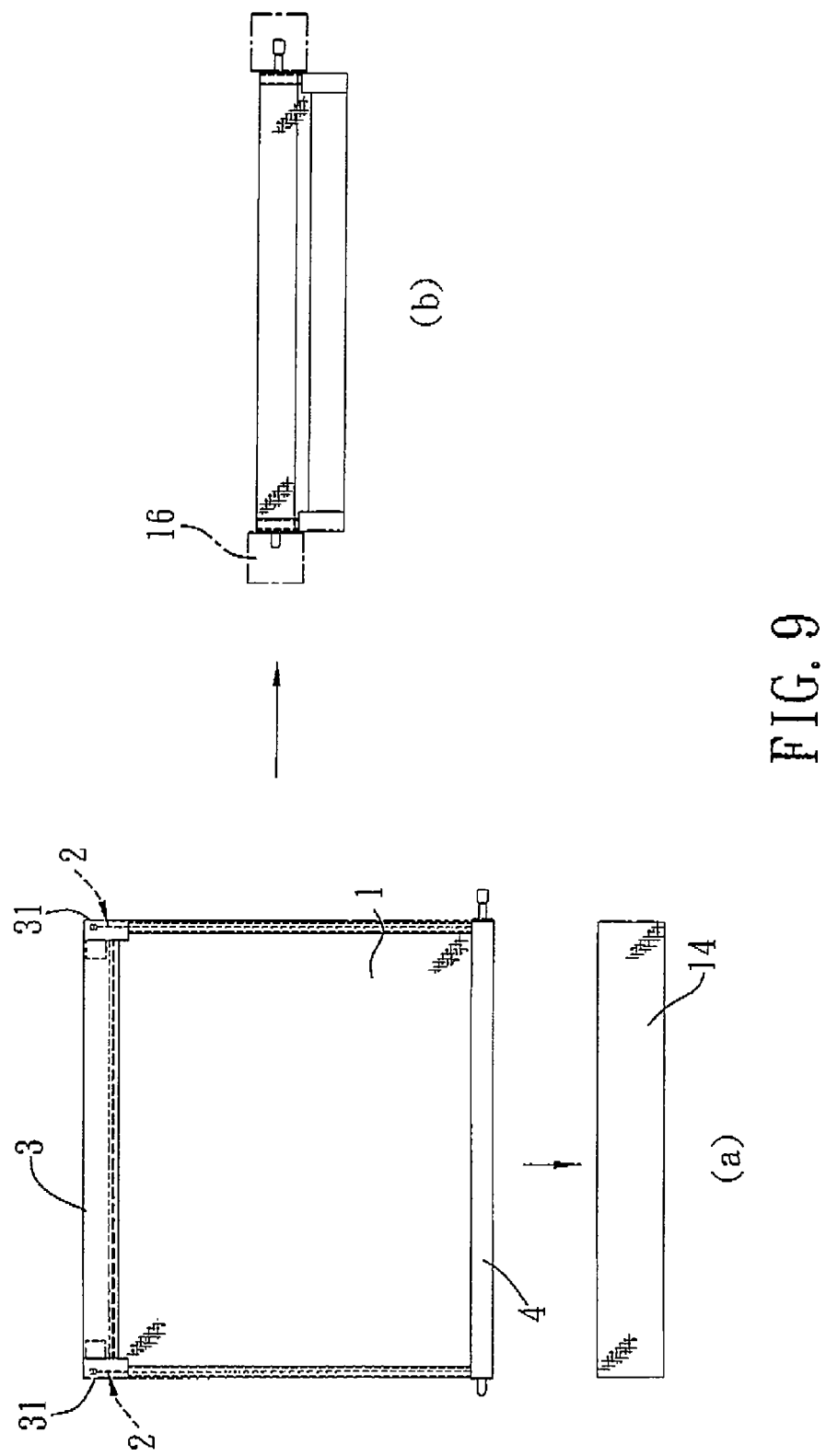
FIGS. 9a~b are schematic views, illustrating the steps of cutting and winding of the sunshade cloth, respectively.

With reference to FIGS. 6 and 7, the front cord extension sections 21 of the tension cords 2 are respectively clamped on two cord-pulling tools 25, and the cloth-pulling tool 15 is activated to apply a rearward pulling force to pull the sunshade cloth 1 rearward. Simultaneously, the cord-pulling tools 25 are activated, and through a weight 251 that is hung on each cord-pulling tool 25, each tension cord 2 is pulled forward. At this time, a push tool 26 that is disposed below the sunshade cloth 1 is activated to push the sunshade cloth 1 upward between the front and rear ends thereof so that the sunshade cloth 1 is gradually arched upward and is stretched between the front and rear ends. Further, the tension cords 2 are also pulled along with the sunshade cloth 1. In this way, the tensile forces of the tension cords 2 can be measured. During tensioning, an operator may adjust the cord-pulling tools 25 so that the tensile forces of the tension cords 2 are equal, after which the connection tool 43 is activated to press the winding shaft 9 downward and to attach the winding shaft 4 to the sunshade cloth 1 using the double-sided adhesive tape 44. A front terminal piece pressing tool (not shown) is then used to press and fix the front terminal pieces 24 on the front cord extension sections 21 of the respective tension cords 2. After the pressures of the push tool 26, the cord-pulling tool 25, and the cloth-pulling tool 15 are released, with reference to FIG. 8, the front terminal pieces 24 are removed from the front terminal piece pressing tool, and the portion of each tension cord 2 that extends forward beyond the respective front terminal piece 24 is trimmed. The pull rod 3 is removed from the pull rod fixing seat 32 (see FIG. 6), and the front terminal pieces 24 are inserted respectively into end grooves (not shown) of the end pieces 31. Simultaneously, the rear end 14 of the sunshade cloth 1 is removed from the cloth-pulling tool 15, and the winding shaft 4 is removed from the connection tool 43.

To cut the sunshade cloth 1, with reference to FIG. 9a, the winding shaft 4 is fixed to a cutting device (not shown), after which the rear end 14 of the sunshade cloth 1 that is disposed at the rear side of the winding shaft 4 is cut off using the cutting device. After cutting, the winding shaft 4 is removed from the cutting device. The user then holds and applies opposite forces to the pull rod 3 and the winding shaft 4 to tighten the tension cords 2 that are respectively looped around the cord grooves (not shown) of the end pieces 31.

Finally, to wind the sunshade cloth 1, with reference to FIG. 9b, the sunshade cloth 1 is wound using an automatic winding machine.

It should be noted that the sequence of assembling the pull rod and assembling the winding unit may be interchanged. That is, assembling the winding unit may be performed first before assembling the pull rod. Both may also be performed simultaneously. Further, the sequence of assembling the left and right side portions does not necessarily mean assembling the left side first before the right side. For example, to assemble the winding unit, the spring unit 42 may be assembled with the right side of the winding shaft 4 first before the latch unit 41 is assembled with the left side of the winding shaft 4.

The front and rear terminal pieces 24, 23 may also be pre-sleeved on the respective front and rear cord extension sections 21, 22 of each tension cord 2 to prepare the sunshade cloth 1 and after each tension cord 2 extends through the sleeve 11. Knots are then tied at the ends of the front and rear cord extension sections 21, 22 to prevent removal of the front and rear terminal pieces 24, 23 therefrom. As such, only positioning of the rear and front terminal pieces 23, 24 are performed while assembling the winding unit and the stretching of the sunshade cloth 1, respectively. Moreover, prior to assembling the winding unit, the latch unit 41 and the spring unit 42 may be lightly inserted into the respective left and right ends of the winding shaft 4, so that while assembling the winding unit, after the rear terminal pieces 23 are inserted into the respective end grooves of the latch unit 41 and the spring unit 42, the winding shaft assembly tool is used to thrust the rear terminal pieces 23 into the winding shaft 4. As to stretching the sunshade cloth, the front terminal pieces 24 may be inserted into the respective end pieces 31 while cutting the sunshade cloth or while removing the winding shaft 4 from the cutting device.

Through stretching the sunshade cloth, the present invention not only uses the cloth-pulling tool 15 to stretch smoothly the sunshade cloth 1, but also uses the cord-pulling tools 25 to pull the tension cords 2 so that the tension cords 2 are subjected to a pulling force or an elastic strain and have elastic forces to return to their original lengths. When the sunshade device of the present invention is used, the pull rod 3 is activated to move the left and right sides of the sunshade cloth 1 to slide respectively along two slide rails (not shown). Because of the tensioning of the tension cords 2, loosening of the sunshade cloth 1 can be prevented. Further, if the user accidentally pushes the sunshade cloth 1, through the tensile force of the tension cords 2, the left and right sides of the sunshade cloth 1 can be pulled back automatically to the slide rails. Hence, the sunshade cloth 1 can be prevented from moving out of the slide rails.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method of making a sunshade device, comprising:
attaching two tension cords respectively to left and right sides of a sunshade cloth, and allowing the tension cords to extend beyond front and rear ends of the sunshade cloth to form front and rear cord extension sections;
attaching a pull rod to the front end of the sunshade cloth, and inserting two end pieces into two opposite ends of the pull rod;
fixing the rear cord extension sections to a latch unit and a spring unit, respectively, and inserting the latch unit and the spring unit respectively into two opposite ends of a tubular winding shaft;
positioning the pull rod;
clamping the rear end of the sunshade cloth;
drawing the front cord extension sections to extend forward and outward of the sunshade cloth to move the tubular winding shaft close to the rear end of the sunshade cloth;
using two cord-pulling tools to clamp the front cord extension sections, respectively;
activating the cord-pulling tools to pull the front cord extension sections, respectively;
fixing the front cord extension sections to the respective end pieces; and
fixing the tubular winding shaft to the sunshade cloth.

2. The method of claim 1, wherein the rear end of the sunshade cloth is stretched by using a cloth-pulling tool to clamp and pull the rear end of the sunshade cloth, the cloth-pulling tool being activated to apply a rearward pulling force to pull the sunshade cloth rearward while the cord-pulling tools apply the pulling forces to the front cord extension sections to pull the front cord extension sections frontward.

3. The method of claim 1, wherein a weight is hung on each of the front cord extension sections to apply a front pulling force to pull each front cord extension section frontward.

4. The method of claim 1, further comprising the step of providing a push tool below the sunshade cloth to push the sunshade cloth between the front and rear ends of the sunshade cloth so that the sunshade cloth is arched and stretched between the front and rear ends.

5. The method of claim 1, wherein the front end of the sunshade cloth is formed as a tubular end, and the pull rod is attached to the front end of the sunshade cloth by inserting a cross bar into the tubular end followed by inserting the tubular end and the cross bar into the pull rod.

6. The method of claim 1, further comprising, after the tubular winding shaft is fixed to the sunshade cloth, fixing the tubular winding shaft to a cutting device and cutting off the rear end of the sunshade cloth that extends beyond the tubular winding shaft.

7. The method of claim 1, further comprising, after the sunshade cloth is cut, winding up the sunshade cloth using an automatic winding machine.

8. The method of claim 1, wherein each of the left and right sides of the sunshade cloth is folded and stitched to form a sleeve for passage of one of the tension cords.

* * * * *